United States Patent [19]

Kwon

[11] Patent Number: 5,432,550
[45] Date of Patent: Jul. 11, 1995

[54] CAMCORDER EQUIPPED WITH A FUNCTION FOR CORRECTING BRIGHTNESS ON THE SIDES OF A SCREEN

[75] Inventor: Hyun-Koo Kwon, Inchun, Rep. of Korea

[73] Assignee: Daewoo Electronic Co., Ltd., Seoul, Rep. of Korea

[21] Appl. No.: 176,479

[22] Filed: Dec. 29, 1993

[30] Foreign Application Priority Data

Mar. 23, 1993 [KR] Rep. of Korea .................. 93-04527

[51] Int. Cl.$^6$ ............................................. H04N 5/20
[52] U.S. Cl. ...................................... 348/255; 348/28
[58] Field of Search ............... 348/251, 255, 229, 615, 348/678, 25, 28; H04N 5/20

[56] References Cited

U.S. PATENT DOCUMENTS

| | | | |
|---|---|---|---|
| 4,628,362 | 12/1986 | Waehner | 348/678 |
| 4,654,710 | 3/1987 | Richard | 358/169 |
| 4,811,101 | 3/1989 | Yagi | 358/171 |
| 4,837,625 | 6/1989 | Douziech et al. | 348/678 |
| 5,023,649 | 6/1991 | Hayashi et al. | 354/434 |
| 5,087,976 | 2/1992 | Oda et al. | 348/28 |
| 5,221,963 | 6/1993 | Hashimoto et al. | 358/209 |

FOREIGN PATENT DOCUMENTS

| | | | |
|---|---|---|---|
| 0205383 | 12/1986 | European Pat. Off. | H04N 5/20 |
| 2683414 | 5/1993 | France | H04N 5/20 |

*Primary Examiner*—James J. Groody
*Assistant Examiner*—Jeffrey S. Murrell
*Attorney, Agent, or Firm*—Beveridge, DeGrandi, Weilacher & Young

[57] ABSTRACT

A camcorder equipped with a function for correcting a brightness on sides of the camcorder screen which automatically compensates the brightness on the sides of screen is described. The camcorder includes an amplifier which varies gain of inputted image signal; a first detection member which averages image signal of amplifier; a first comparator which compares output of first detection member with standard voltage; a window signal generation member which outputs a horizontal and a vertical window signals corresponding to the horizontal and vertical window signal among image signals outputted from amplifier; a non-window area detection member detecting an image signal which does not correspond to the horizontal and vertical window signals among image signals outputted from amplifier; a first comparison part which compares an output of the window detection member with that of the non-window detection member; a first gain control member which outputs a signal controlling according to an output of the first comparison part of image signal during horizontal and vertical window signal generation; a counting means which counts outputs of the first comparator and first gain control member and outputs the result to amplifier, so that it can automatically compensates the difference in luminance between the sides and center and records an image signal on magnetic recording medium.

5 Claims, 5 Drawing Sheets

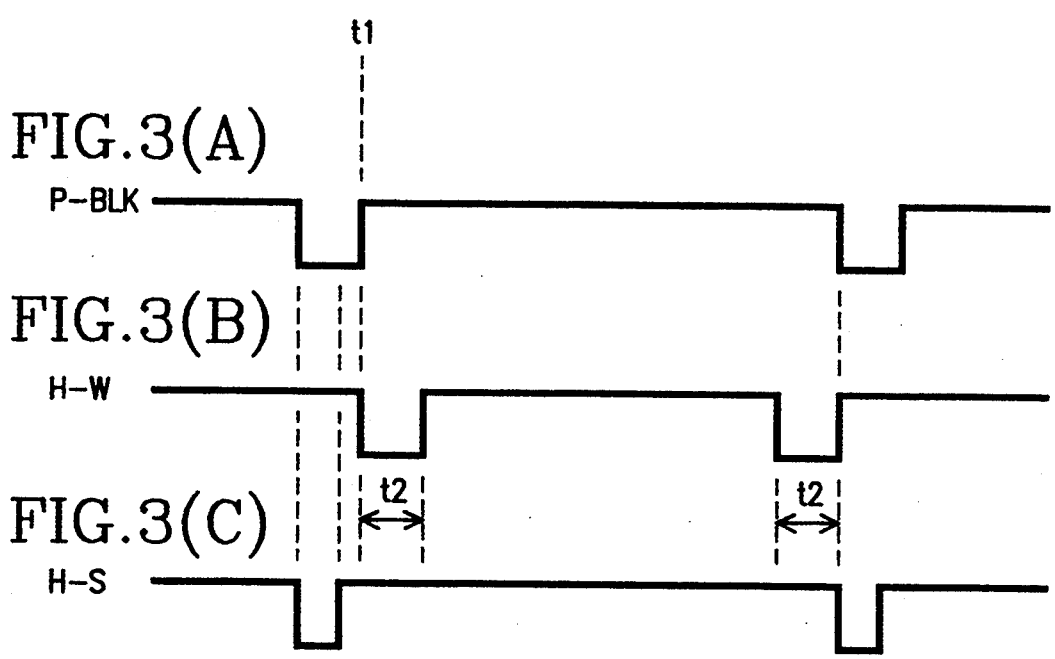
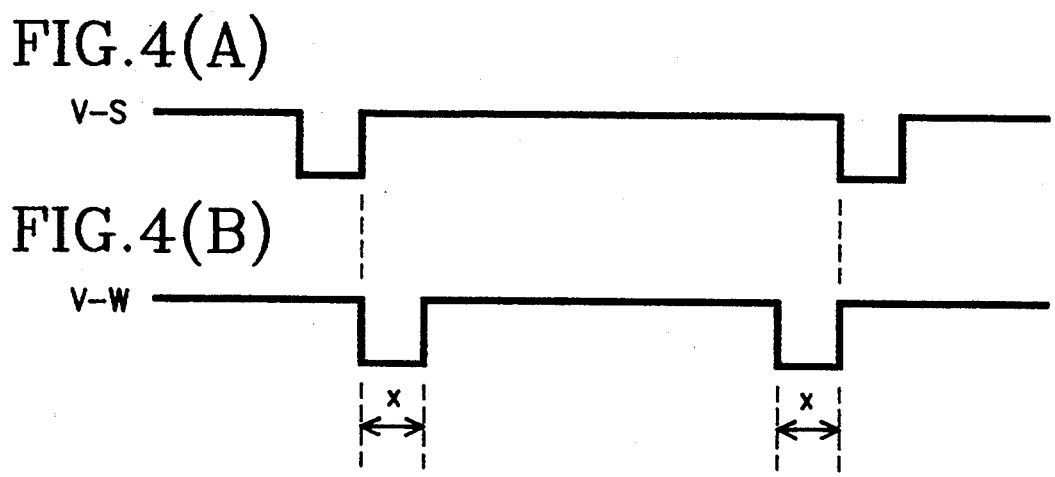

5,432,550

CAMCORDER EQUIPPED WITH A FUNCTION FOR CORRECTING BRIGHTNESS ON THE SIDES OF A SCREEN

BACKGROUND OF THE INVENTION

1. Field of the Invention

The present invention relates to a camcorder, particularly to a camcorder equipped with a function for correcting brightness on the sides of a screen by automatically compensating the difference in luminance between the sides and center of the screen, thereby making the image signal which is taken at the same volume of lights recorded on the magnetic recording medium.

2. Description of the Prior Art

In general, in a camcorder, a subject is taken with a different volume of lights being injected to the sides and the center of the screen due to the optical lens, and the image signal is recorded on a magnetic recording medium; therefore, it causes an inferior screen quality because of the difference of luminance between the sides and the center of the screen.

Recently, a proposal was disclosed in U.S. Pat. No. 5,221,963 in which in case the main subject is dark and the background is bright, the difference in luminance is detected and the difference in luminance between the main subject and the background is compensated by changing the compression knee of correction means and by changing the compression rate according to the detected difference in luminance.

However, the above-mentioned prior art has the problem that construction becomes complicated since two CCDs of R,B-CC and G-CCD are used together with three CDS (Charge-Doubled Sampling), LDF (Low Pass Filer) and AGC (Automatic Gain Controller), and production cost increases. Further, the process compensating the gain is complicated since AGC is used in order to compensate the gain resulting from shutting the iris when a part becomes bright.

SUMMARY OF THE INVENTION

The object of the present invention is to provide a circuit which automatically compensates the difference of luminance between the sides and the center of the camcorder screen by the use of Automatic Gain Controller (AGC).

In order to accomplish the object, the present invention comprises an amplifier which outputs the gain of inputted image signal variably according to the gain control signal; first detector which averages image signals of said amplifier; window signal generator which in a camcorder containing the first comparator outputting the gain control signal made according to the difference between the outputs of said first detector and the first standard voltage, outputs the vertical window signal designating a predetermined time before and after horizontal erasing signal and horizontal window signal designating a predetermined time before and after vertical synchronizing signal; window area detector which detects and outputs only image signal corresponding to the vertical or horizontal window signals among the image signals outputted from said amplifier; non-window area detector which detects and outputs only the signal which does not correspond to the vertical and horizontal window signals among the image signals outputted from said amplifier; first comparator comprising the second detector which averages and outputs the image signal outputted from said window area detector, third detector which averages and outputs the image signal outputted from said non-window area detector and second comparator which compares and outputs the image signal outputted from said second and third detectors; first gain controller which outputs the signal which controls the gain of the image signal at the time when the vertical and horizontal window signals are generated according to said first comparator; counting means which outputs the addition of output signals of said first comparator and of first gain controller to said amplifier.

BRIEF DESCRIPTION OF THE DRAWINGS

The drawings attached so as to explain in more detail the circuit for correcting brightness on the sides of the camcorder screen are as follows:

FIG. 3 (A) is a waveform diagram of a combined erasing signal used for generating a window signal in the present invention.

FIG. 3 (B) is a waveform diagram of a horizontal window signal outputted from the window signal generator of the present invention.

FIG. 3 (C) is a waveform diagram of horizontal synchronizing signal included in a combined erasing signal in (A).

FIG. 4 (A) is a waveform diagram of vertical synchronizing signal used for generating a window signal in the present invention.

FIG. 4 (B) is a waveform diagram of a vertical window signal outputted from a window signal generator of the present invention.

FIG. 6 (B) is a waveform diagram of gain control signal outputted from the first comparator of the present invention.

FIG. 6 (C) is a waveform diagram of gain control signal outputted from counting means of the present invention.

FIGS. 7 (C) and 7 (D) are waveform diagrams of image signals outputted according to the present invention.

DESCRIPTION OF THE PREFERRED EMBODIMENT

Figure 1:
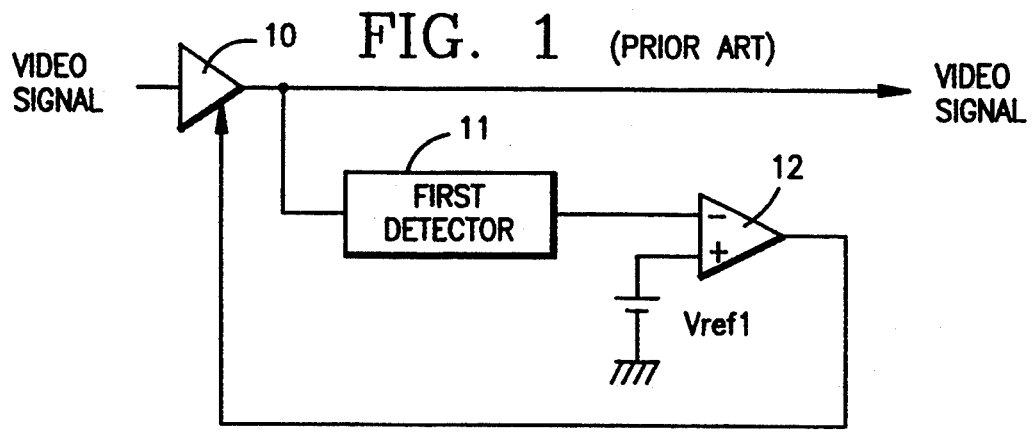
FIG. 1 is a block diagram of the apparatus for automatically controlling the gain in a general camcorder.

The circuit for correcting brightness on the sides of the camcorder screen is explained in reference to the attached drawings as follows:

FIG. 1 is a diagram of a circuit for correcting brightness on the sides of camcorder screen according to the general camcorder. A general automatic gain control apparatus is formed by installing first detector 11, which averages the amplified image signal, on the output platform of amplifier 10 which outputs inputted gain of image signal variably according to a gain control signal and by being equipped with first comparator 12 which outputs gain control signal according to the difference between output from said first detector and first standard voltage $V_{ref1}$.

Figure 2:
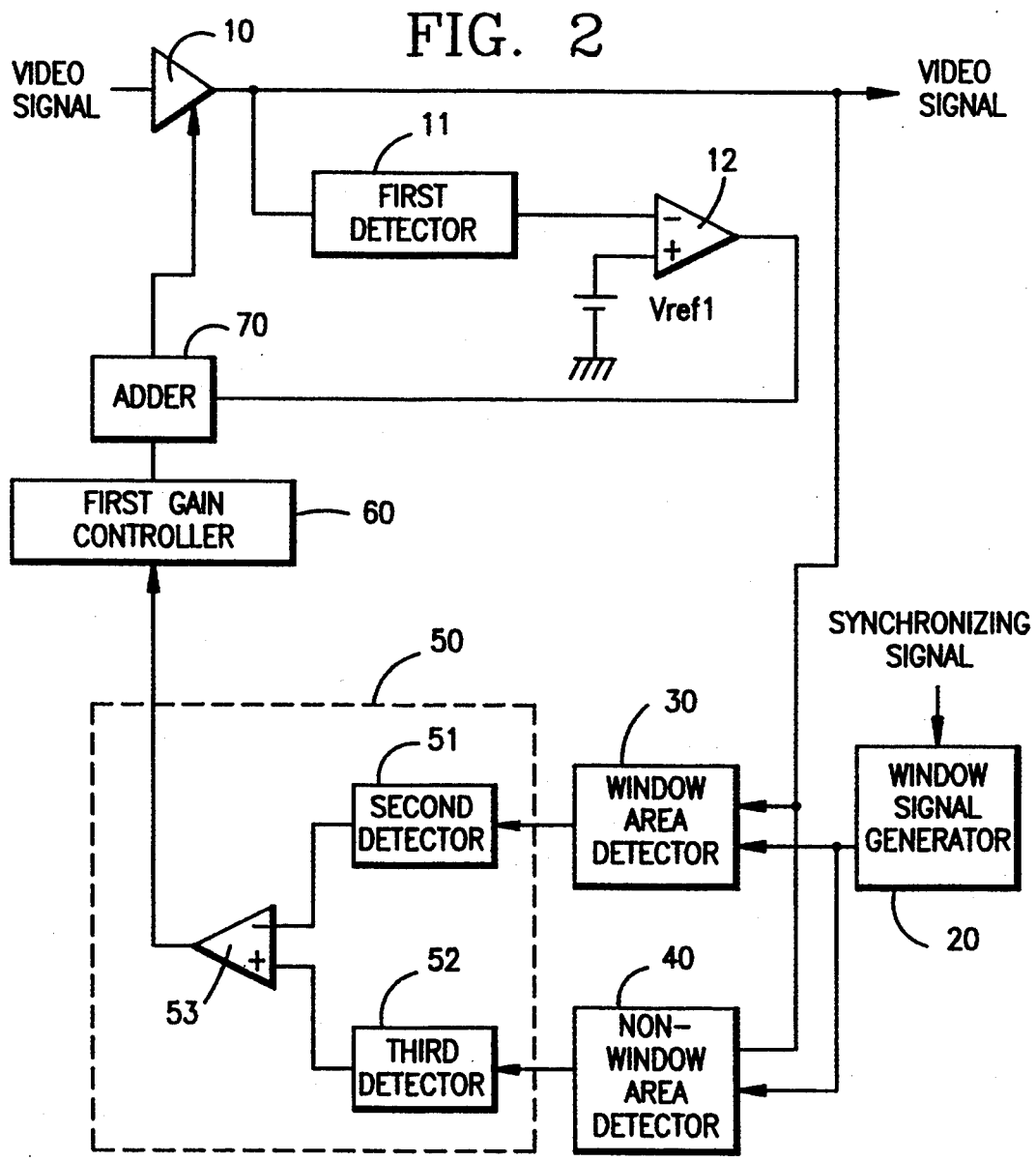
FIG. 2 is a block diagram of a circuit for correcting brightness on the sides of a camcorder screen according to the present invention.

FIG. 2 is a diagram of the subject invention which is further constructed in addition to said FIG. 1, wherein output platform of said amplifier 10 is equipped with window signal generator 20 which generates vertical and horizontal window signals by the use of combined erasing signals, window area detector 30 which detects the image signals which corresponds to the vertical and horizontal signals among the signals outputted from said amplifier 10, and non-window area detector 40 which does not correspond to the vertical and horizontal signals.

Output platforms of said window detector 30 and non-window detector 40 are equipped with first comparator 50 which comprises second detector 51 which averages image signals of said window area detector, third detector 52 which averages image signals of said non-window area detector 40 and second comparator 53 which compares the output of second detector 51 with that of third detector 52, which are inputted as inverting terminal and non-inverting terminal, respectively.

Output platform of said first comparator 50 is equipped with first gain controller 60 which outputs a certain level of gain control signal when inputting a high level and outputs gain control signal to increase the gain at a low level.

Output platform of said first gain controller 60 is equipped with counting means 70 which adds the gain control signal of said first comparator and gain control signal of said first gain controller and outputs the result to said amplifier 10.

The present invention constructed as above will be explained in more detail in reference to FIGS. 3 to 7.

The image signal inputted from Charge-Coupled Device (CCD) is inputted to inverting terminal of the first comparator 12 after being averaged at first detector 11 through amplifier 10, and compared with a predetermined first voltage $V_{ref1}$ which will be transmitted to non-inverting terminal, so as to output the voltage according to the average voltage and standard voltage as automatic gain control signals.

Window signal generator 20 outputs horizontal window signal H-W as shown on FIG. 3 (B) by the use of Pre-Blanking signal (P-BLK signal). The Pre-Blanking signal (P-BLK signal) is a signal which designates an erasing period for a return of a scanning line to be performed, including horizontal synchronizing signal H-S section as shown on FIG. 3 (C) and from the point $t_1$ the Pre-Blanking signal (P-BLK signal) ends and pure image signal begins to work in its place.

That is, window signal generator 20 outputs horizontal window signal H-W which can designate only the image signals during the time before and after Pre-Blanking signal (P-BLK signal) $t_2$ by the use of Pre-Blanking signal (P-BLK signal).

Window signal generator 20 outputs vertical window signal V-W which can designate the image signals of a predetermined scanning line after vertical synchronizing signal V-S and before vertical synchronizing signal V-S.

Therefore, window area detector 30 detects horizontal window signal H-W outputted from window signal generator 20 and image signal falling under vertical window signal V-W section among the image signals outputted from amplifier 10, while non-window area detector 40 detects the horizontal window signal H-W outputted from window signal generator 20 and image signal which does not fall under vertical window signal V-W section.

Figure 5A:
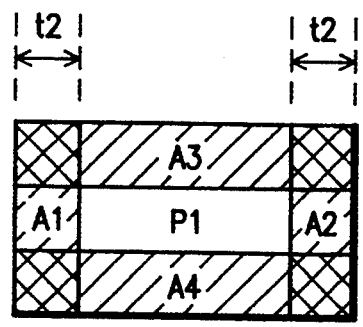
FIGS. 5 (A) and 5 (B) show division of the screen by the vertical and horizontal window signals.
Figure 5B:
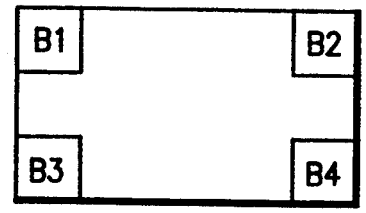

For example, as shown in FIG. 5 (A), image signal areas corresponding to horizontal window signal H-W which forms a scene $P_1$ will be $A_1$ and $A_2$, and those corresponding to vertical window signal V-W will be $A_3$ and $A_4$.

Therefore, as in FIG. 5 (B), image signals on areas $B_1$ to $B_4$ which are included in all areas $A_1$ to $A_4$ are outputted from window area detector 30 and image signals corresponding to the rest areas are outputted from non-window area detector 40.

Furthermore, image signals outputted from window area detector 30 and non-window area detector 40 are inputted to and averaged in second detector 51 and third detector 52 of first comparator 50 and compared through second comparator 53.

Figure 6A:
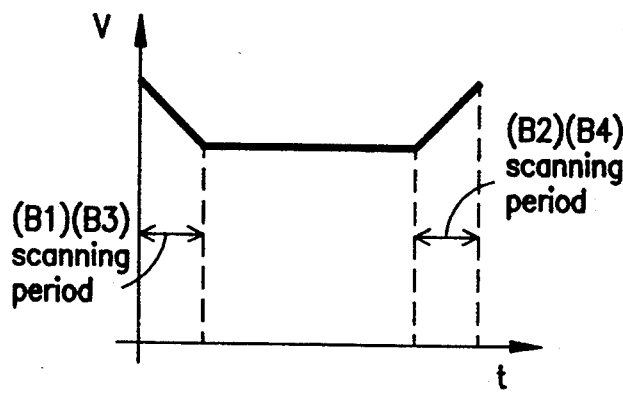
FIG. 6 (A) is a waveform diagram of gain control signal outputted by the first gain controller of the present invention.
Figure 6B:
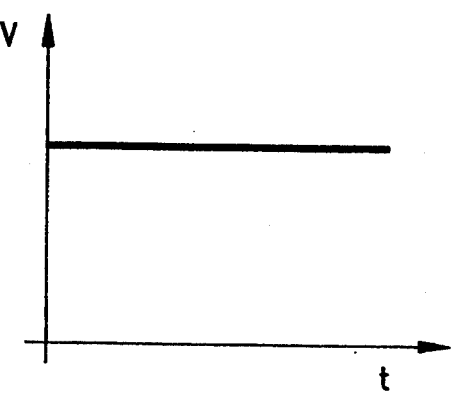
Figure 6C:
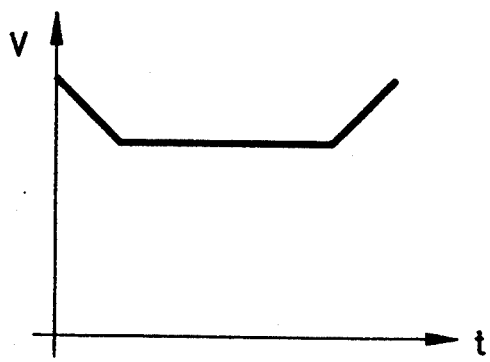
Figure 7A:
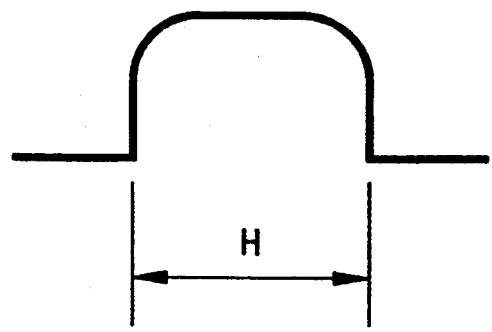
FIGS. 7 (A) and 7 (B) are waveform diagrams of image signals outputted from the prior amplifier.
Figure 7B:
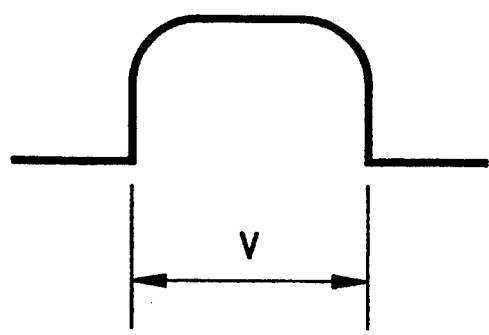
Figure 7C:
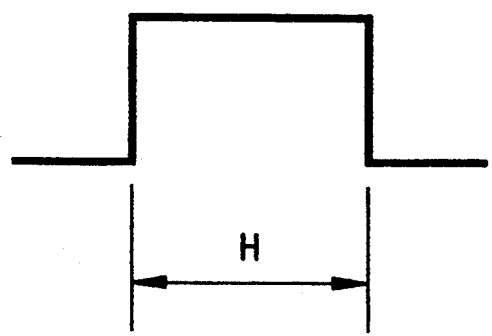
Figure 7D:
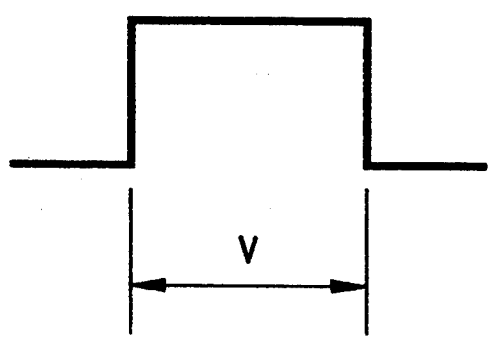

If the level of image signal detected in window area detector 30 is higher than that detected in non-window area detector 40, the lower level is inputted to first gain controller through second comparator 53 and as in FIG. 6 (A), first gain controller outputs gain control signal which increases the gain of image signal in horizontal window signal section and vertical window signal section.

If the level of image signal detected in window area detector 30 is lower than that detected in non-window area detector 413, the higher level is inputted to first gain controller and a certain level of gain control signal is outputted.

At this time, gain control signal increases the gain of amplifier 10 as it approaches sides of the screen as in FIG. 6(A). The gain control signal is counted with gain control signal which is outputted from counting means 70 through first comparator 12 as in FIG. 6 (B) and outputs the gain control signal to amplifier 10 as in fig. 6 (C).

Therefore, in case the volume of light on the sides of the screen which is taken on Charge-Coupled Device (CCD) is less than that on the center, counting means 70 inputs gain control signal, which increases the gain of sides of the screen, to amplifier 10 so that image signals taken with same volume of lights on sides and center of the screen can be recorded on a magnetic recording medium.

That is, the amplifier 10 in prior automatic gain control apparatus outputs the image signals as in FIGS. 7 (A) and (B) during one horizontal period and one vertical period, while the amplifier 10 of the present invention outputs image signals as in FIGS. 7 (C) and (D).

Figure 8:
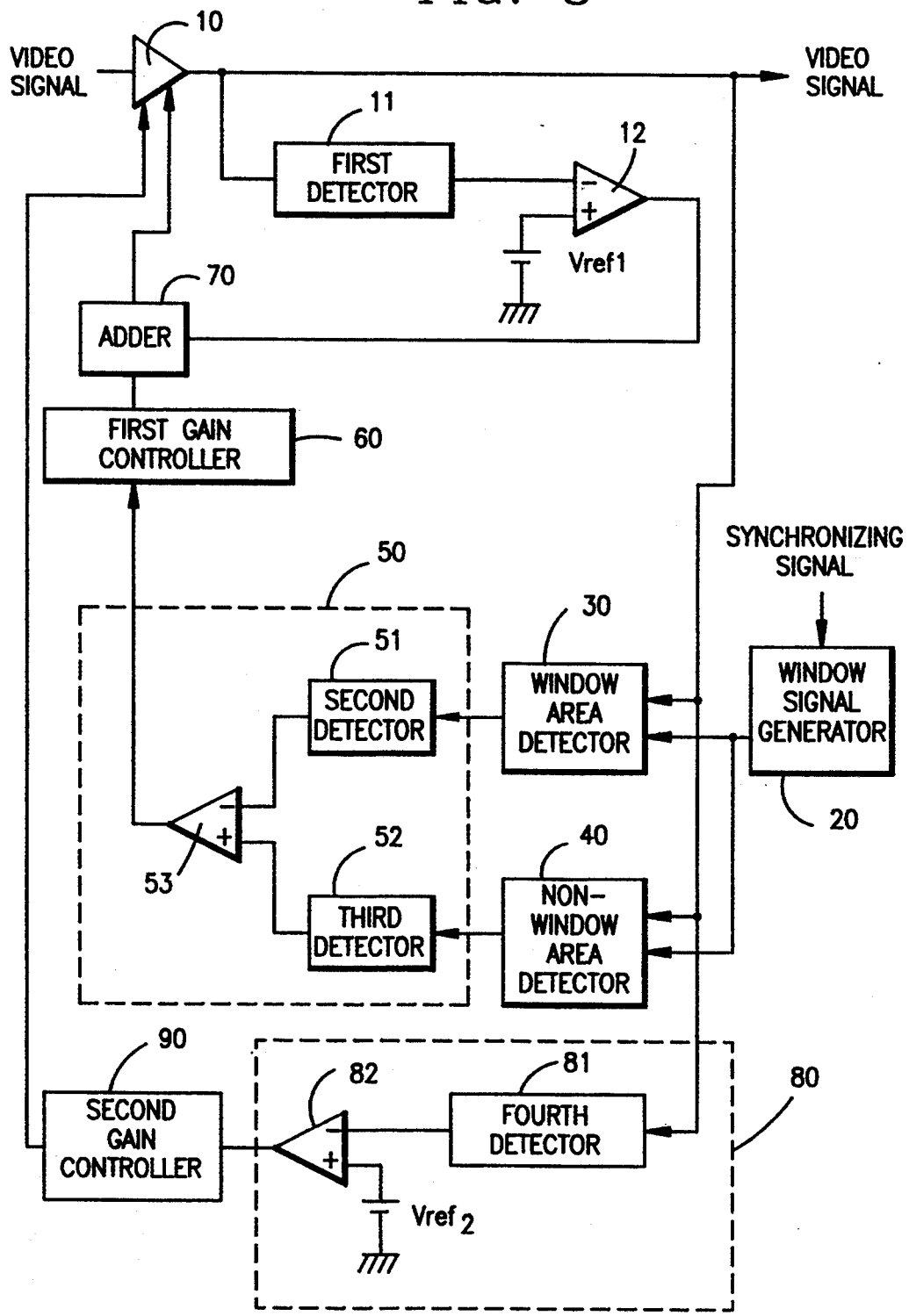
FIG. 8 is a block diagram showing the embodiment according to the circuit for correcting brightness on the sides of the camcorder screen of the present invention.

FIG. 8, which shows another embodiment of the present invention, presents a case in which the indoor light not being sufficiently given, the difference of the luminance in the sides and center of the screen is larger than before.

In this embodiment, second comparator 80 and second gain controller 90 are added to the construction in FIG. 2. That is, second comparator 80 includes fourth detector, which averages image signals outputted through amplifier 10, and third comparator 82 which inputs image signal averaged through said fourth detector 81 to inverting terminal and inputs second standard voltage $V_{ref2}$ to non-inverting terminal. After amplifier 10 is averaged through fourth detector 81, the voltage which is considered to result in the most undesirable brightness will be chosen as second standard voltage $V_{ref2}$.

Second gain controller is constructed to output gain control signal according to an output level of said second comparator 80 to amplifier 10. In this embodiment, in case indoor light is dark, image signal of amplifier 10 is averaged through fourth detector 81 of second comparator 80, and inputted to inverting terminal. At this time, since said image signal is lower than the second standard voltage $V_{ref2}$ inputted to non-inverting terminal, signal of high level is outputted through the third comparator.

Therefore, second gain controller 90 which receives the signal of high level from second comparator 80 outputs gain control signals which can increase the gain of amplifier to the maximum. Accordingly, in case that a scene is taken when it is dark, darkening on the sides, compared with the center, can be compensated.

As stated so far, circuit for correcting the brightness on the sides of the camcorder screen of the present invention has an effect of preventing the worsening of the quality of the screen in such a way that when a scene is taken with the sides and center being under different luminance, the difference of luminance between the sides and the center of screen is automatically compensated, and therefore, image signal with no difference in luminance between the sides and the center of screen is recorded on magnetic recording medium.

What is claimed is:

1. In a camcorder having an amplifier which outputs a gain of an inputted image signal variably according to a gain control signal; a first detection means which averages the image signal of said amplifier; a first comparator which compares a first output from said first detection means with a first standard voltage and outputs a first gain control signal according to a gap between said first output and said first standard voltage, the improvement comprising a correction means for correcting a brightness on sides of camcorder screen, the correction means including:

a window signal generation means which outputs a horizontal window signal which designates a predetermined time before and after a horizontal synchronizing signal and a vertical window signal which designates a predetermined time before and after a vertical synchronizing signal;

a window area detection means which detects and outputs a first image signal among image signals outputted from said amplifier, said first image signal corresponds to said horizontal and vertical window signals;

a non-window area detection means which detects and outputs a second image signal among the image signals outputted said amplifier, said second image signal does not correspond to said horizontal and vertical window signals;

a first comparison means which compares a level of the first image signals outputted from said window area detection means with a level of the second image signal from said non-window area detection means and outputs a first comparison signal;

a first gain control means which outputs a second gain control signal for increasing the gain of the image signal during generation of the horizontal and vertical window signals according to the first comparison signal of said first comparison means;

a counting means which adds the first gain control signal of said first comparator and the second gain control signal of said first gain control means to transmit the result as said gain control signal to said amplifier.

2. The improvement as in claim 1, wherein said window signal generation means outputs the horizontal window signal by the use of the horizontal synchronizing signal, and outputs the vertical window signal by the use of the vertical synchronizing signal.

3. The improvement as in claim 1, wherein said first comparison means comprises a second detection means which averages the first image signal detected by said window area detection means, a third detection means which averages the second image signal detected by said non-window area detection means, and a second comparator which compares a second output of said second detection means with a third output of said third detection means.

4. In a camcorder which comprises an amplifier which outputs a gain of an inputted image signal variably according to a gain control signal; a first detection means which averages the image signal of said amplifier; a first comparator which compares a first output from said first detection means with a first standard voltage and outputs a first gain control signal according to a gap between said first output and said first standard voltage, the improvement comprising a correction means for correcting a brightness of sides of camcorder screen, said correction means including:

a window signal generation means which outputs a horizontal window signal designating a predetermined time before and after a horizontal synchronizing signal and a vertical window signal designating a predetermined time before and after a vertical synchronizing signal;

a window area detection means which detects and outputs a first image signal among image signals outputted from said amplifier, said first image signal corresponds to said horizontal and vertical window signals;

a non-window area detection means which detects and outputs a second image signal among the image signals outputted from said amplifier, said second image signal does not correspond to said horizontal and vertical window signals;

a first comparison means which compares a level of the first image signal outputted from said window area detection means with a level of the second image signal outputted from said non-window area detection means and outputs a first comparison signal;

a first gain control means which outputs a second gain control signal for increasing the gain of the image signal during generation of the horizontal and vertical window signals according to the first comparison signal of said first comparison means;

a counting means which adds the first gain control signal of said first comparator and the second gain control of said first gain control means to transmit the result as said gain control signal to said amplifier;

a second comparison means which compares the level of the image signal of said amplifier with a second standard voltage value and outputs a second comparison signal;

a second gain control means which outputs a third gain control signal according to the second comparison signal of said second comparison means; and said amplifier which outputs the gain of the inputted image signals variably according to the third gain control signal of said second gain control means.

5. The improvement as in claim 4, wherein said second comparison means comprises a fourth detection means which averages the image signal of said amplifier and a third comparator which compares a fourth output voltage of said fourth detection means and the second standard voltage.

* * * * *